(12) United States Patent
Fukui et al.

(10) Patent No.: US 10,974,687 B2
(45) Date of Patent: Apr. 13, 2021

(54) GAS GENERATOR

(71) Applicant: DAICEL CORPORATION, Osaka (JP)

(72) Inventors: Yuki Fukui, Tatsuno (JP); Tomoharu Kobayashi, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 105 days.

(21) Appl. No.: 16/338,908

(22) PCT Filed: Oct. 16, 2017

(86) PCT No.: PCT/JP2017/037317
§ 371 (c)(1),
(2) Date: Apr. 2, 2019

(87) PCT Pub. No.: WO2018/088132
PCT Pub. Date: May 17, 2018

(65) Prior Publication Data
US 2020/0039463 A1 Feb. 6, 2020

(30) Foreign Application Priority Data

Nov. 10, 2016 (JP) .............................. JP2016-219328

(51) Int. Cl.
*B60R 21/264* (2006.01)
*B60R 21/272* (2006.01)
*B60R 21/26* (2011.01)

(52) U.S. Cl.
CPC .......... *B60R 21/264* (2013.01); *B60R 21/272* (2013.01); *B60R 2021/26011* (2013.01); *B60R 2021/26029* (2013.01)

(58) Field of Classification Search
CPC ..... B60R 21/26; B60R 21/264; B60R 21/272; B60R 2021/26011; B60R 2021/26029; B60R 2021/2648; B01J 7/00
(Continued)

(56) References Cited

U.S. PATENT DOCUMENTS 6,315,322 B1 * 11/2001 Mika .................. B60R 21/2644
280/736
6,364,354 B1 * 4/2002 Nakashima ........ B01D 46/2411
280/736
(Continued)

FOREIGN PATENT DOCUMENTS

| JP | 2009-137478 A | 6/2009 |
|----|---------------|--------|
| JP | 2010-540331 A | 12/2010 |

(Continued)

OTHER PUBLICATIONS

International Search Report (PCT/ISA/210) issued in PCT/JP2017/037317, dated Dec. 26, 2017.
(Continued)

*Primary Examiner* — James A Shriver, II
*Assistant Examiner* — Hilary L Johns
(74) *Attorney, Agent, or Firm* — Birch, Stewart, Kolasch & Birch, LLP

(57) ABSTRACT

The present invention provides a gas generator including:
a housing including a top plate, a bottom plate axially opposite to the top plate, and a circumferential wall located between the top plate and the bottom plate and provided with a gas discharge port;
a partition wall having a single connection hole and a second communication hole, the partition wall being radially disposed in the housing to partition an interior of the housing into a first combustion chamber on the side of the top plate, which accommodates a first gas
(Continued)

generating agent, and a second combustion chamber on the side of the bottom plate, which accommodates a second gas generating agent;

an inner cylindrical member disposed in the housing to enclose the first igniter attached to the bottom plate, such that a second end opening side thereof passes through the connection hole in the partition wall in order to be located within the first combustion chamber, closer to the top plate than the partition wall is, and to be spaced from the top plate;

the second end opening being closed by a first closing member and the second communication hole being closed by a second closing member; and the gas generating agent also being provided between the top plate and the second end opening closed by the first closing member.

8 Claims, 3 Drawing Sheets

(58) Field of Classification Search
USPC .................................. 280/736, 741
See application file for complete search history.

(56) References Cited

U.S. PATENT DOCUMENTS

| | | | | |
|---|---|---|---|---|
| 6,709,012 B1* | 3/2004 | Tanaka | ............... | B60R 21/017 280/736 |
| 6,793,244 B1* | 9/2004 | Katsuda | ............... | B60R 21/272 280/741 |
| 7,175,197 B2* | 2/2007 | Iwai | ............... | B60R 21/2644 280/736 |
| 7,665,764 B2* | 2/2010 | Matsuda | ............... | B60R 21/2644 280/741 |
| 8,236,112 B2* | 8/2012 | Yamazaki | ............... | B60R 21/2644 149/2 |
| 8,590,929 B2* | 11/2013 | Nakayasu | ............... | F42B 3/04 280/741 |
| 9,452,729 B2* | 9/2016 | Bierwirth | ............... | B60R 21/261 |
| 9,669,795 B2* | 6/2017 | Wang | ............... | B60R 21/263 |
| 2002/0005636 A1* | 1/2002 | McFarland | ............... | B60R 21/2644 280/736 |
| 2003/0137138 A1* | 7/2003 | Nakashima | ............... | B60R 21/2644 280/741 |
| 2004/0046373 A1* | 3/2004 | Wang | ............... | B60R 21/261 280/741 |
| 2004/0061319 A1* | 4/2004 | Saso | ............... | B60R 21/2644 280/741 |
| 2004/0124618 A1* | 7/2004 | Schonhuber | ............... | B60R 21/2644 280/736 |
| 2005/0225064 A1* | 10/2005 | Suehiro | ............... | B60R 21/2644 280/741 |
| 2006/0119087 A1* | 6/2006 | Blessing | ............... | B60R 21/2644 280/736 |
| 2006/0131853 A1* | 6/2006 | Iwai | ............... | B60R 21/2644 280/736 |
| 2006/0137786 A1* | 6/2006 | Yamazaki | ............... | C06D 5/06 149/22 |
| 2007/0046005 A1* | 3/2007 | Hanano | ............... | B60R 21/2644 280/736 |
| 2007/0057496 A1* | 3/2007 | Matsuda | ............... | B60R 21/2644 280/737 |
| 2008/0136152 A1* | 6/2008 | McFarland | ............... | B60R 21/264 280/736 |
| 2010/0186616 A1* | 7/2010 | Reichelt | ............... | B60R 21/2644 102/530 |
| 2014/0054881 A1* | 2/2014 | Fukawatase | ............... | B60R 21/26 280/741 |
| 2019/0241149 A1* | 8/2019 | Kobayashi | ............... | B60R 21/268 |

FOREIGN PATENT DOCUMENTS

WO     WO 03/066390 A1     8/2003
WO     WO 2012/153427 A1     11/2012

OTHER PUBLICATIONS

Written Opinion (PCT/ISA/237) issued in PCT/JP2017/037317, dated Dec. 26, 2017.

* cited by examiner

[Fig. 1]
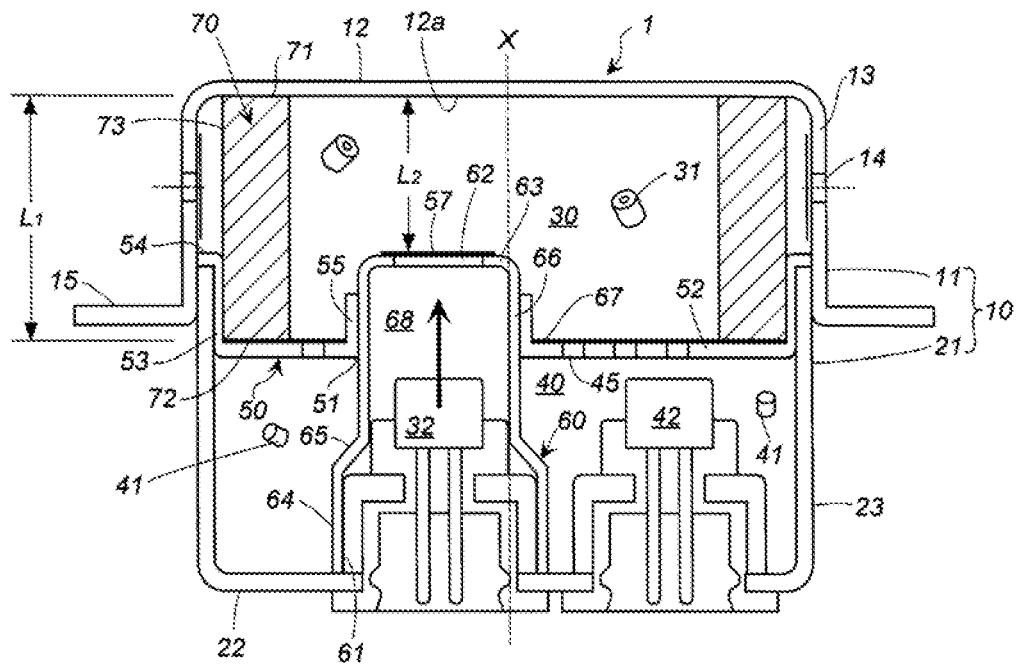
[Fig. 2]
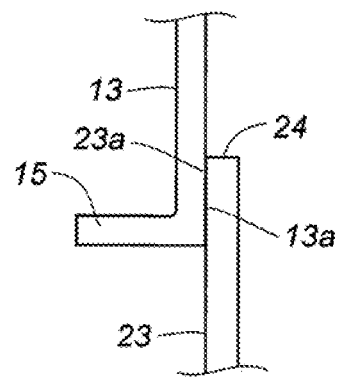

[Fig 3]
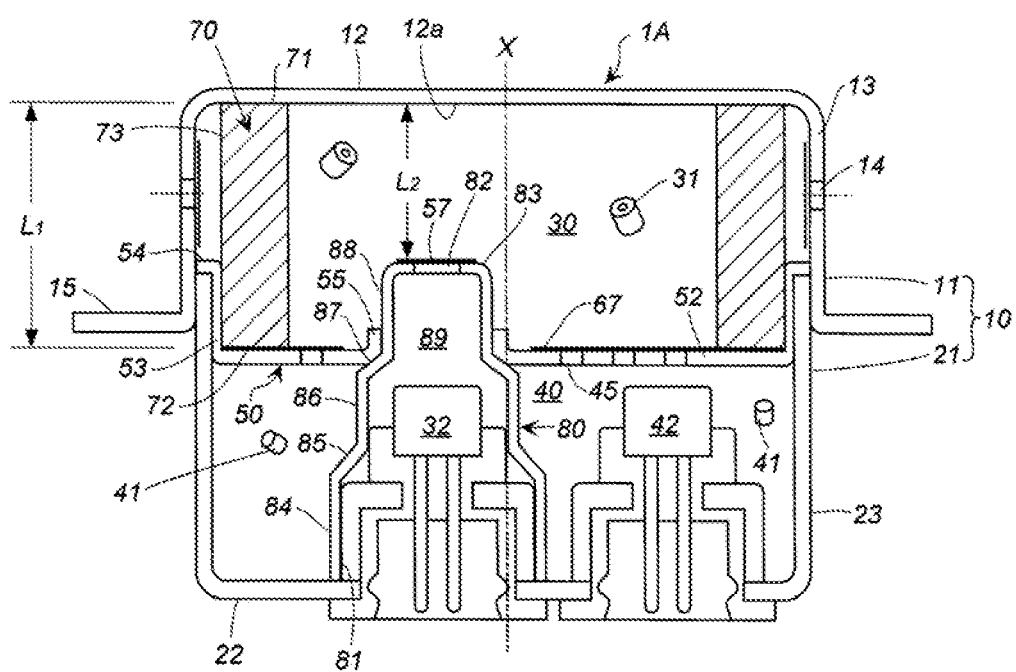

[Fig 4]
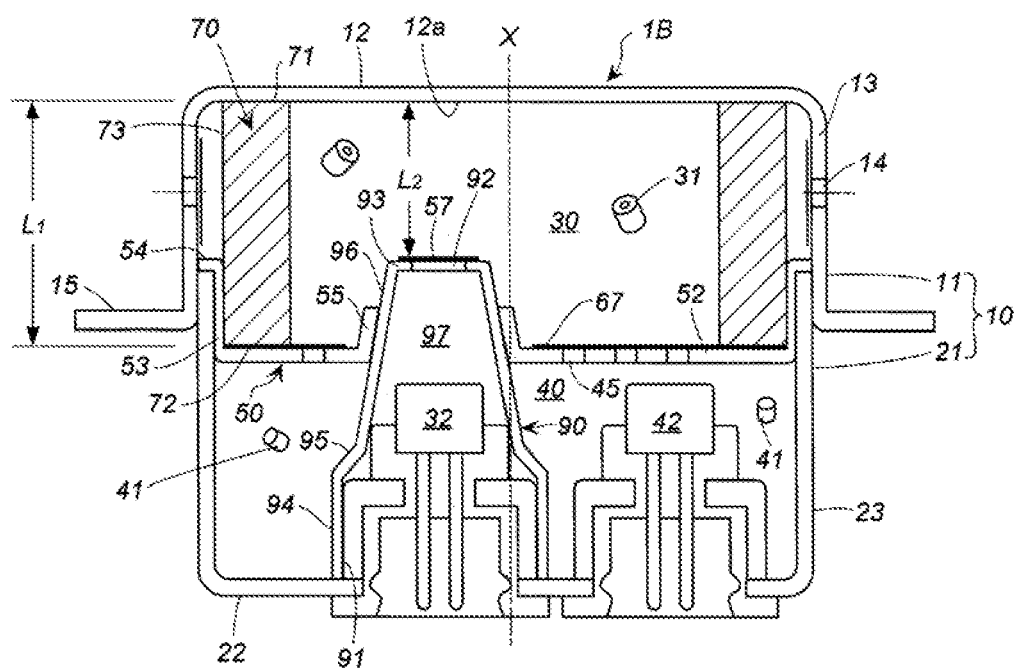

GAS GENERATOR

TECHNICAL FIELD

The present invention relates to a gas generator usable in an airbag apparatus of an automobile.

DESCRIPTION OF RELATED ART

In a housing of a gas generator, a combustion chamber accommodating a gas generating agent is arranged, and the gas generating agent is to be ignited and burned by an igniter fixed to the housing. In some gas generators, the igniter and the gas generating agent are in contact with each other, and such gas generators are also known that the igniter and the gas generating agent are partitioned by a cylindrical member (a tube member).

FIG. 5 of JP2010-540331A discloses a gas generator including a bottom 1 and a cover 2, in which a pipe 14 is disposed and a first chamber 6 and a second chamber 9 are radially partitioned. A lower end of the pipe 14 is fitted around an igniter and an upper end 15 thereof is not in contact with the cover 2. A gap 16 is famed between the upper end 15 and the cover 2. A film 17 is provided on the upper end 15 so that a propellant 7 inside the pipe 14 is sealed and prevented from leaking into the second chamber 9.

At the time of actuation, flames and the like which are generated from the igniter rupture the film 17, subsequently advance along the cover 2 from the gap 16 and enter a combustion chamber (the second chamber 9) to ignite and burn a gas generating agent.

SUMMARY OF INVENTION

The present invention provides a gas generator, including:

a housing including a top plate, a bottom plate located axially opposite to the top plate and a circumferential wall located between the top plate and the bottom plate and provided with a gas discharge port;

a partition wall having a single connection hole and a second communication hole, and the partition wall being radially disposed in the housing to partition an interior of the housing into a first combustion chamber on the side of the top plate, which accommodates a first gas generating agent, and a second combustion chamber on the side of the bottom plate, which accommodates a second gas generating agent;

a first igniter for burning the first gas generating agent in the first combustion chamber and a second igniter for burning the second gas generating agent in the second combustion chamber, the first and second igniters attached to the bottom plate;

an inner cylindrical member disposed in the housing to enclose the first igniter such that a first end opening side thereof is located on the side of the bottom plate, and a second end opening side thereof passes through the connection hole in the partition wall in order to be located within the first combustion chamber, closer to the top plate than the partition wall is, and to be spaced from the top plate, the second end opening being closed by a first closing member and the second communication hole being closed by a second closing member, and the gas generating agent also being provided between the top plate and the second end opening closed by the first closing member.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows a cross-sectional view in an axial direction of an embodiment of a gas generator in accordance with the present invention;

FIG. 2 shows a partial cross-sectional view of a housing of the gas generator depicted in FIG. 1;

FIG. 3 shows a cross-sectional view in an axial direction of a gas generator of a different embodiment from that depicted in FIG. 1; and FIG. 4 shows a cross-sectional view in an axial direction of a gas generator of a different embodiment from those depicted in FIGS. 1 and 3.

DETAILED DESCRIPTION OF INVENTION

In FIG. 5 of JP2010-540331A, when flames and the like which are generated from the igniter enter the second chamber 9 from the gap 16, the gas generating agent sequentially is burned from top to bottom in FIG. 5. Thus, combustion ability of the entire gas generating agent is not good. In the case where large disk-shaped gas generating agents are accommodated as depicted in FIG. 5, large gaps are obtained between the gas generating agents, which makes a combustion ability good. However, in the case where smaller gas generating agents are accommodated, the gaps becomes smaller, which lowers the combustion ability.

The present invention provides a gas generator which improves ignition ability and combustion ability of an entire first gas generating agent accommodated in a first combustion chamber.

When a bottom plate of a housing is located on the lower side and a top plate thereof is located on the upper side, an interior of the housing is vertically partitioned into two combustion chambers by a partition wall. A first igniter and a second igniter are both attached to the bottom plate.

The first igniter and the first combustion chamber are connected to each other through an inner cylindrical member, and the first igniter and a first gas generating agent are not in contact with each other. In an internal space of the inner cylindrical member, the first igniter is attached to the bottom plate and the remaining space may include nothing or may accommodate a known transfer charge or a gas generating agent capable of functioning as a known transfer charge. The second igniter is disposed inside a second combustion chamber and the second igniter may be in contact with a second gas generating agent.

The first combustion chamber is in communication with the second combustion chamber via a second communication hole famed in the partition wall. The second communication hole may include a single hole or a plurality of holes.

As a first closing member closing a second end opening of the inner cylindrical member, a seal tape in which an adhesive layer is famed on a base material made of stainless steel, aluminum, or the like can be used. Alternatively, when a transfer charge is used, the second end opening can be closed by a surface of an aluminum container filled with the transfer charge. The second communication hole is closed by a second closing member famed of the seal tape described above or the like.

A space large enough to accommodate the gas generating agent is formed between the top plate and the second end opening which is closed by the first closing member, of the inner cylindrical member inside the first combustion chamber, and the gas generating agent is present in the space.

Combustion products such as flames are generated when the first igniter is actuated. Combustion products such as flames and combustion gas are generated when the transfer charge is accommodated inside the inner cylindrical member.

The generated combustion products advance in a straight line in a state of being concentrated in a narrow range by a function of the inner cylindrical member, rupture the first closing member, ignite and burn the first gas generating agent present between the second end opening and the top plate inside the first combustion chamber, and subsequently collide with the top plate. The combustion products bounce back after colliding with the top plate and are diffused to ignite and burn the remaining first gas generating agent inside the first combustion chamber.

When two combustion chambers are provided, it is generally designed to produce a larger amount of the combustion gas in the first combustion chamber. Thus, an improvement of the ignition ability of the first gas generating agent in the first combustion chamber is highly effective. With the gas generator in accordance with the present invention, the combustion products generated by actuation of the igniter are diffused in the above described manner and thereby, the ignition ability and the combustion ability of the entire first gas generating agent in the first combustion chamber are improved without increasing output of the first igniter. In particular, since the housing is vertically partitioned by disposing the partition wall, a distance between the partition wall, which corresponds to a bottom portion of the first combustion chamber, and the top plate is shortened, and the combustion products reflected by the top plate easily reach a periphery of the partition wall. Thus, the combustion ability of the entire first gas generating agent is improved. Preferably, the partition wall is located closer to the top plate than an ignition portion is. The ignition portion accommodates an ignition charge for the first igniter.

In a preferred aspect of the gas generator in accordance with the present invention, the inner cylindrical member has an inner annular surface extending radially inward at the second end opening, and the second end opening is closed by the first closing member disposed on the inner annular surface.

The inner annular surface famed at the second end opening of the inner cylindrical member enables a closing member to be disposed and also functions to concentrate the discharge of the combustion products due to the reduced diameter of second end opening. Further, by disposing the first closing member on the second end opening (the inner annular surface), it is possible to cause the closing member to rupture at the point in time when a pressure inside the inner cylindrical member is sufficiently increased during actuation. With such an arrangement, the combustion products are ejected more powerfully and a diffusion range and a diffusion rate after the combustion products collide with the top plate are increased, and, as a result, the combustion ability of the entire gas generating agent are preferably enhanced.

As the closing member, a seal tape in which an adhesive layer is famed on a base material made of stainless steel, aluminum, or the like may be used. When the transfer charge is used, the second end opening may be closed by a surface of an aluminum container filled with the transfer charge.

In another preferred aspect of the gas generator in accordance with the present invention, a distance L1 from an inner surface of the partition wall to an inner surface of the top plate and a distance L2 from the second end opening of the inner cylindrical member to the inner surface of the top plate satisfy a relationship represented as L2/L1=0.5 to 0.9.

The L2/L1 is preferably within a range of 0.5 to 0.9 and more preferably within a range of 0.6 to 0.8. When the L2/L1 described above is satisfied, the diffusion range of the combustion products upon collision with the top plate after ejected from the second end opening is widened and the ignition and combustion abilities of the entire first gas generating agent in the first combustion chamber are improved.

In the gas generator in accordance with the present invention, the ignition ability and the combustion ability of the entire first gas generating agent accommodated in the first combustion chamber are improved.

The gas generator in accordance with the present invention is usable as a gas generator for an airbag apparatus mounted to an automobile.

Embodiments of the Present Invention (1) Gas Generator Depicted in FIG. 1

An embodiment of the gas generator in accordance with the present invention will be described with reference to FIG. 1.

A gas generator 1 has a housing 10 including a diffuser shell 11 and a closure shell 21. The diffuser shell 11 and the closure shell 21 are both made of a metal such as iron or stainless steel. The diffuser shell 11 includes a top plate 12 and an upper circumferential wall 13, and a plurality of gas discharge ports 14 are famed at regular intervals in a circumferential direction in the upper circumferential wall 13. The upper circumferential wall 13 has a flange 15 at an opening thereof. The plurality of gas discharge ports 14 are closed from inside by a metallic seal tape.

The closure shell 21 includes a bottom plate 22 and a lower circumferential wall 23. Two holes spaced apart from each other are foiled in the bottom plate 22, and a first igniter 32 and a second igniter 42 are mounted to the two holes respectively. The first igniter 32 and the second igniter 42 are both disposed at positions eccentric to a central axis X. The first igniter 32 is disposed at a position closer to the central axis X of the housing 10, and the second igniter 42 is disposed at a position further from the central axis X of the housing 10 as compared to the first igniter 32. In the embodiment depicted in FIG. 1, the first igniter 32 is disposed such that a central axis of the first igniter 32 is located within a range of 20% to 30% of a distance from the central axis X to the lower circumferential wall 23. Further, in the embodiment depicted in FIG. 1, the second igniter 42 is disposed such that a central axis of the second igniter 42 is located within a range of 40% to 60% of the distance from the central axis X to the lower circumferential wall 23.

As depicted in FIG. 2, in the housing 10, an inner surface 13a in a vicinity of the opening of the upper circumferential wall 13 of the diffuser shell 11 and an outer surface 23a in a vicinity of an opening of the lower circumferential wall 23 of the closure shell 21 are in contact with each other, and the contact portion is welded and fixed in this state. As depicted in FIG. 2, in the housing 10, the closure shell 21 is fitted into the diffuser shell 11, so that an annular stepped surface 24 is famed between the upper circumferential wall 13 and an annular end surface of the lower circumferential wall 23.

An interior of the housing 10 is partitioned by a radially disposed partition wall 50 into a first combustion chamber 30 on the side of the top plate 12 and a second combustion chamber 40 on the side of the bottom plate 22. A first gas generating agent 31 is accommodated in the first combustion chamber 30 and a second gas generating agent 41 is accommodated in the second combustion chamber 40.

The partition wall 50 has a single connection hole 51 formed at a position eccentric to the central axis X of the housing 10 toward the side of the circumferential wall (the upper circumferential wall 13 and the lower circumferential wall 23), and second communication holes 45 including a plurality of through holes. The partition wall 50 has a flat surface 52, an outer annular wall 53 extending toward the top plate 12 from an outer circumferential edge of the flat surface 52, and an outer annular surface 54 protruding radially outward from the outer annular wall 53. Furthermore, the partition wall 50 has an inner annular wall 55 extending toward the top plate 12 from an inner circumferential edge along the connection hole 51 of the flat surface 52. In the partition wall 50, the outer annular surface 54 abuts against the annular stepped surface 24, the outer annular wall 53 abuts against the lower circumferential wall 23, and the inner annular wall 55 abuts against an inner cylindrical member 60.

The inner cylindrical member 60 is disposed in the housing 10 so as to enclose the first igniter 32. The inner cylindrical member 60 is preferably made of a same material as the housing 10. The inner cylindrical member 60 is disposed such that a first end opening 61 abuts against the bottom plate 22 while enclosing a collar of the first igniter 32, and that a second end opening 62 of the inner cylindrical member passes through the connection hole 51 to be located in the first combustion chamber 30.

The inner cylindrical member 60 has the first end opening 61 on the side of the bottom surface 22 and the second end opening 62 on the side of the top plate 12, and an inner annular surface 63 protruding radially inward is formed at the second end opening 62. In the inner cylindrical member 60 depicted in FIG. 1, an outer diameter thereof varies from the first end opening 61 toward the second end opening 62, and a larger diameter portion 64 on the side of the first end opening 61, a smaller diameter portion 66 on the side of the second end opening 62 and an inclined surface 65 between the larger diameter portion 64 and the smaller diameter portion 66 are famed. An outer diameter of the larger diameter portion 64 and an outer diameter of the smaller diameter portion 66 satisfy a relationship represented by the outer diameter of larger diameter portion 64>the outer diameter of smaller diameter portion 66. The larger diameter portion 64 is in contact with and fitted to the collar of the first igniter 32, and a distal end of the smaller diameter portion 66 protrudes above an upper end of the inner annular wall 55 (on the side of the first combustion chamber 30) and is disposed at a position closer to the top plate 12 than the flat surface 52 of the partition wall 50 is.

An interior of the inner cylindrical member 60 is an accommodating space for the first igniter 32 and, when a transfer charge is accommodated therein, the remaining space excluding the first igniter 32 is a transfer charge chamber 68. The second end opening 62 is closed by a first closing member 57 famed of a seal tape affixed to the inner annular surface 63 from the first combustion chamber 30 and, at the time of actuation, the second end opening 62 becomes a first communication hole which allows the transfer charge chamber 68 to communicate with the first combustion chamber 3.

The gas generator 1 in accordance with the present invention can also be a gas generator 1A in which an inner cylindrical member 80 depicted in FIG. 3 is used in place of the inner cylindrical member 60 depicted in FIG. 1. The inner cylindrical member 80 depicted in FIG. 3 has a first end opening 81 and a second end opening 82, and the second end opening 82 has an inner annular surface 83 protruding inwardly. In the inner cylindrical member 80, an outer diameter and an inner diameter thereof decrease stepwise from the first end opening 81 toward the second end opening 82, and a larger diameter portion 84 on the side of the first end opening 81, a smaller diameter portion 88 on the side of the second end opening 82, an intermediate diameter portion 86 between the larger diameter portion 84 and the smaller diameter portion 88, a first inclined surface 85 between the larger diameter portion 84 and the intermediate diameter portion 86, and a second inclined surface 87 between the intermediate diameter portion 86 and the smaller diameter portion 88 are famed. The larger diameter portion 84 is in contact with and fitted to the collar of the first igniter 32, and a distal end of the smaller diameter portion 88 protrudes above the upper end of the inner annular wall 55 (on the side of the first combustion chamber 30) and is disposed at a position closer to the top plate 12 than the flat surface 52 of the partition wall 50 is. An ejection rate and a concentrating effect of the discharge of the combustion products which are generated in the transfer charge chamber 89 are preferably enhanced because the inner cylindrical member 80 is narrowed toward the second end opening 82.

Further, the gas generator 1 in accordance with the present invention can also be a gas generator 1B in which an inner cylindrical member 90 depicted in FIG. 4 is used in place of the inner cylindrical member 60 depicted in FIG. 1. The inner cylindrical member 90 depicted in FIG. 4 has a first end opening 91 and a second end opening 92, and the second end opening 92 has an inner annular surface 93 protruding inwardly. In the inner cylindrical member 90, an outer diameter and an inner diameter decrease from the first end opening 91 toward the second end opening 92, a larger diameter portion 94 on the side of the first end opening 91, a first inclined surface 95 that continues from the larger diameter portion 94, and a second inclined surface 96 from the first inclined surface 95 to the second end opening 92 are formed. An outer diameter and an inner diameter of the second inclined surface 96 continuously decrease from a boundary portion with the first inclined surface 95 toward the second end opening 92. The larger diameter portion 94 is in contact with and fitted to the collar of the first igniter 32, and about a half of the second inclined surface 96 protrudes above the inner annular wall 55 (on the side of the first combustion chamber 30), and the inner annular surface 93 is disposed at a position closer to the top plate 12 than the flat surface 52 of the partition wall 50 is.

An ejection rate and a concentrating effect of the discharge of combustion products which are generated in the transfer charge chamber 97 are preferably enhanced at the second end opening 92 because the inner cylindrical member 90 is narrowed such that the outer diameter and the inner diameter of the second end opening 92 are smaller than the outer diameter and the inner diameter of the first end opening 91.

A plurality of the second communication holes 45 allow the second combustion chamber 40 to communicate with the first combustion chamber 30 at the time of actuation. In the gas generators depicted in FIGS. 1, 3, and 4, the second communication holes 45 are famed at positions that are axially opposite to the second igniter 42 and also at positions that are not axially opposite to the second igniter 42 in the partition wall 50, but the second communication holes 45 may be famed only at the positions that are not axially opposite to the second igniter 42. In the case where the second communication holes 45 are famed only at the positions that are not axially opposite to the second igniter 42, combustion ability of the entire second gas generating agent 41 is preferably enhanced because a second closing member 67 is ruptured at the time when an overall pressure in the second combustion chamber 40 reaches high. The plurality of second communication holes 45 are closed from the first combustion chamber 30 by the second closing member 67 famed of a metallic adhesive tape.

A distance L1 from an inner surface (a surface on the side of the first combustion chamber 30) of the partition wall 50 to an inner surface 12a of the top plate 12 and a distance L2 from the second end opening 62 (a surface facing the first combustion chamber 30 of the inner annular surface 63) of the inner cylindrical member 60 to the inner surface 12a of the top plate 12 are set such that L2/L1 is approximately 0.7. The second end opening (the first communication hole) 62 of the inner cylindrical member 60 is positioned inside the first combustion chamber 30 and the first gas generating agent 31 is also present between the top plate 12 and the second end opening 62.

In the embodiment depicted in FIG. 1, a cylindrical filter 70 is disposed inside the first combustion chamber 30. In the cylindrical filter 70, a first end surface 71 abuts against the top plate 12, a second end surface 72 abuts against the flat surface 52 of the partition wall 50, and a lower part (on the side of the bottom plate 22) of an outer circumferential surface 73 abuts against the outer annular wall 53. A cylindrical gap is formed between the cylindrical filter 70 and the upper circumferential wall 13 provided with the gas discharge ports 14.

An operation of the gas generator 1 depicted in FIG. 1, when mounted to an airbag apparatus will be described below. The gas generator 1 in accordance with the present invention exhibits an advantageous effect not only in the case where the first igniter 32 actuates first and the second igniter 42 actuates with a delay, but also in the case where the first igniter 32 and the second igniter 42 actuate simultaneously and in the case where only the first igniter 32 actuates. Hereinafter, the case where the first igniter 32 actuates first will be described.

When the first igniter 32 actuates first, flames and the like generated from the first igniter 32 ignite and burn the transfer charge inside the transfer charge chamber 68 to generate combustion products. The combustion products generated inside the transfer charge chamber 68 are concentrated by a function of the inner annular surface 63 of the inner cylindrical member 60 and advance in a straight line, rupture the first closing member 57, ignite and burn the first gas generating agent 31 present between the second end opening 62 and the top plate 12, and subsequently collide with the top plate 12. The combustion products bounce back after colliding with the top plate 12 and are subsequently diffused, and promote ignition and combustion of the entire first gas generating agent 31 inside the first combustion chamber 30.

Since L2/L1 is set to 0.7 in the embodiment depicted in FIG. 1, a diffusion range of the combustion products colliding with the top plate 12 after ejected from the second end opening 62 is wide and the combustion products more easily reach the partition wall 50. Further, since combustion products, which are generated by the combustion of the first gas generating agent 31 present between the second end opening 62 and the top plate 12, are also reflected by the top plate 12, an ignition performance of an unignited gas generating agent located in the vicinity of the partition wall 50 is improved.

The combustion gas generated by the combustion of the first gas generating agent 31 passes through the cylindrical filter 70, ruptures the seal tape, and is discharged from the gas discharge ports 14 to inflate an airbag. When the second igniter 42 is actuated, the second gas generating agent 41 is ignited and burned to generate a combustion gas. The generated combustion gas ruptures the second closing member 67 and flows into the first combustion chamber 30 from the second communication holes 45, passes through the cylindrical filter 70, and is discharged from the gas discharge ports 14 to further inflate the airbag.

Even with the use of the gas generator 1A depicted in FIG. 3 and the gas generator 1B depicted in FIG. 4, the gas generators 1A and 1B operate in a similar manner to the gas generator 1 depicted in FIG. 1. Since the inner cylindrical member 80 of the gas generator 1A depicted in FIG. 3 and the inner cylindrical member 90 of the gas generator 1B depicted in FIG. 4 are more tapered than the inner cylindrical member 60 depicted in FIG. 1, the concentrating effect of the discharge of the combustion products is further enhanced and, consequently, the diffusion effect of the combustion products after colliding with the top plate 12 and the effect of the combustion products reaching the partition wall 50 are also further enhanced.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
    a housing including a top plate, a bottom plate located axially opposite to the top plate, and a circumferential wall located between the top plate and the bottom plate and provided with a gas discharge port;
    a partition wall having a single connection hole and a second communication hole, the partition wall being radially disposed in the housing to partition an interior of the housing into a first combustion chamber on the side of the top plate, which accommodates a first gas generating agent, and a second combustion chamber on the side of the bottom plate, which accommodates a second gas generating agent;
    a first igniter for burning the first gas generating agent in the first combustion chamber and a second igniter for burning the second gas generating agent in the second combustion chamber, the first and second igniters attached to the bottom plate;
    an inner cylindrical member having a first end opening and a second end opening, the inner cylindrical member disposed in the housing to enclose the first igniter such that,
    a first end opening side thereof is located on the side of the bottom plate, the second end opening side thereof is located on the side of the top plate, and
    the second end opening side thereof passes through the connection hole of the partition wall in order for the second end opening to be located within the first combustion chamber, closer to the top plate than the partition wall is, and to be spaced from the top plate;
    the second end opening being closed by a first closing member and the second communication hole being closed by a second closing member, and the first gas generating agent also being provided between the top plate and the second end opening closed by the first closing member.

2. The gas generator according to claim 1, wherein the inner cylindrical member has an inner annular surface extending radially inward at the second end opening, and
the second end opening is closed by the first closing member disposed on the inner annular surface.

3. The gas generator according to claim 1, wherein a distance L1 from an inner surface of the partition wall to an inner surface of the top plate and a distance L2 from the second end opening of the inner cylindrical member to the inner surface of the top plate satisfy a relationship represented as L2/L1=0.5 to 0.9.

4. The gas generator according to claim 1, wherein the partition wall has an inner annular wall extending toward the top plate from an inner circumferential edge along the connection hole, and the inner annular wall abuts against the inner cylindrical member.

5. The gas generator according to claim 1, wherein an outer diameter and an inner diameter of the inner cylindrical member decrease stepwise from the first end opening toward the second end opening.

6. The gas generator according to claim 1, wherein an outer diameter and an inner diameter of the inner cylindrical member decrease from the first end opening toward the second end opening, wherein a larger diameter portion on a side of the first end opening, a first inclined surface that continues from the larger diameter portion and a second inclined surface from the first inclined surface to the second end opening are formed.

7. The gas generator according to claim 1, wherein the second communication hole includes a plurality of second communication holes that allow the second combustion chamber to communicate with the first combustion chamber at the time of actuation, and the plurality of second communication holes are closed from the first combustion chamber by the second closing member.

8. The gas generator according to claim 1, wherein the inner cylindrical member, the top plate, and the partition wall are configured such that i) the second end opening side protrudes from the partition wall and the second end opening is closer to the top plate than the partition wall, ii) combustion products, which are produced by the first igniter, rupture the first closing member, ignite and burn the first gas generating agent present between the second end opening and the top plate inside the first combustion chamber, and collide with the top plate, and then ii) the combustion products are bounced from the top plate and diffused to ignite and burn the remaining first gas generating agent inside the first combustion chamber.

* * * * *